(12) United States Patent
Reponen

(10) Patent No.: US 7,884,824 B2
(45) Date of Patent: Feb. 8, 2011

(54) METHOD FOR PROCESSING STATUS INFORMATION ON DETERMINED FUNCTIONS IN WIRELESS TERMINAL DEVICE

(75) Inventor: Erika Reponen, Tampere (FI)

(73) Assignee: Nokia Corporation, Espoo (FI)

( * ) Notice: Subject to any disclaimer, the term of this patent is extended or adjusted under 35 U.S.C. 154(b) by 1764 days.

(21) Appl. No.: 10/866,841

(22) Filed: Jun. 14, 2004

(65) Prior Publication Data

US 2005/0010584 A1 Jan. 13, 2005

(30) Foreign Application Priority Data

Jun. 17, 2003 (FI) .................................. 20030908

(51) Int. Cl.
*G06T 15/00* (2006.01)
(52) U.S. Cl. .................. 345/440; 345/418; 370/328; 370/342; 455/422.1; 455/566
(58) Field of Classification Search ................. 345/440, 345/418; 370/328, 342; 455/422.1, 566
See application file for complete search history.

(56) References Cited

U.S. PATENT DOCUMENTS

| 6,519,482 B1 * | 2/2003 | Mittelstadt et al. .......... 455/566 |
| 6,563,809 B1 * | 5/2003 | Proctor et al. ............... 370/335 |
| 6,671,508 B1 * | 12/2003 | Mitsuoka et al. .......... 455/412.1 |
| 7,486,970 B2 * | 2/2009 | Kim et al. .................... 455/566 |
| 2001/0024951 A1 | 9/2001 | Rignell et al. ............... 455/414 |

FOREIGN PATENT DOCUMENTS

WO     WO 03/041373 A1     5/2003

* cited by examiner

*Primary Examiner*—Phu Nguyen
(74) *Attorney, Agent, or Firm*—Hollingsworth & Funk, LLC

(57) ABSTRACT

A method for processing status information on determined functions in a wireless terminal device. Reference information on the appearance of an element of a display, such as a selection or a background element, and the status of status information is determined. The status of the status information, such as availability, on pointable targets is determined. When a target is pointed by a selection element, the appearance of the element of the display is selected in a predetermined manner in accordance with the status of the status information. The method can be implemented by a wireless terminal device or by a software product arrangeable in a terminal device.

20 Claims, 4 Drawing Sheets

METHOD FOR PROCESSING STATUS INFORMATION ON DETERMINED FUNCTIONS IN WIRELESS TERMINAL DEVICE

FIELD OF THE INVENTION

The invention relates to dynamic status information, particularly to processing status information on determined functions in a wireless terminal device.

BACKGROUND OF THE INVENTION

The number of procedures to be carried out by a wireless terminal device, such as a mobile station, has increased considerably as a result of advances in mobile communication technology. A mobile station is no longer used for calls exclusively, but the mobile station enables information to be processed and presented in a more and more versatile manner. Generally, the display of a mobile station is so small that it restricts the amount and illustrative power of the information to be displayed.

Generally, the display of a wireless terminal device may be divided into a front and a background. According to the prior art, a user of a terminal device receives information only through the front, such as text shown on the display. Since the display is very small and the text to be shown thereon should, however, be large enough to enable the text to be read, the user is provided with only a very small amount of information at once. The display may, however, provide more information e.g. such that the display has to be browsed on, or a procedure has to be selected first on the display. On many occasions, however, it is difficult to browse the display and, typically, selecting a procedure is a separate and often also an additional step in the operating sequence.

According to the prior art, various effects, such as bold characters and icons and colours thereof, are commonly employed on larger displays in particular, such as computer monitors. The icons of Yahoo!® Messenger, for instance, enable e.g. the status of a contact to be presented such that an available person is designated by a smiling smiley while an unavailable person is designated by a sad smiley. In a mobile station also, it would often be useful to receive information e.g. on the status of a contact person in a phonebook. Many effects used on monitors are not, however, directly applicable to the display of mobile stations or, due to the physical smallness of the display, they are not illustrative enough.

BRIEF DESCRIPTION OF THE INVENTION

An object of the invention is thus to provide a procedure so as to enable drawbacks of the above-mentioned problems to be reduced in a wireless mobile station. The object of the invention is achieved by a method, a device and a software product which are characterized by what has been disclosed in the independent claims. Preferred embodiments of the invention are disclosed in the dependent claims.

In the present application, status information refers to information to be registered in a terminal device, e.g. in "status tables" of the terminal device, and to be determined from functional information on the particular terminal device or on an external terminal device. A status server refers to any server which processes status information e.g. by storing status information on terminal devices in "profiles" of the terminal devices, from which the status information may be forwarded e.g. to other terminal devices. A selection element, in turn, refers to any element, such as a cursor or a selection bar generally used for browsing on a display of a mobile station, which enables a desired target to be pointed on a graphical display. In addition to the actual pointing carried out by the above-mentioned element, pointing also refers to opening a page, such as a contact card or an electric business card, in a terminal device, or using a background element of a display in connection with a target.

The idea underlying the invention is that status information on determined functions is processed in a wireless terminal device, such as a mobile station. Reference information on the appearance, such as colour, shape, pattern or a manner of animation, of at least one element of a display, such as a selection or a background element, and the status of the status information is determined in the terminal device e.g. such that red means that a contact residing in a phonebook application is unavailable, and green that the contact is available. The status of the status information on a pointable target, such as a contact in a phonebook, residing in a terminal device application, is determined e.g. such that through a mobile communication network and base transceiver stations, the terminal device receives information indicating whether the terminal device of a contact is connected to the network. When a user of the terminal device points a target, the appearance of an element of the display, such as a selection element or a background element, is selected according to the reference information and the status of the status information in response to pointing the target.

According to a preferred embodiment, the status of the status information on a pointable target is determined such that when a target, such as a contact, is pointed, the terminal device receives status information on a contact from a status server, the status information having been transmitted in advance to the status server by a contact person in order to be stored therein.

The arrangement of the invention provides considerable advantages. An advantage is that a user of a wireless terminal may be provided with a larger amount of and more illustrative status information on a target being pointed. Another advantage is that the user may be provided with information on the status of the target without selecting additional procedures, because e.g. in the phonebook application, the user may see the availability of a contact by simply focusing a selection element on the contact. A yet further advantage is that the arrangement of the invention can be implemented quickly and easily in terminal devices. A still further advantage is that the arrangement of the invention can be used together with known techniques, such as icons generally known by users. Another further advantage is that statuses are determined dynamically, which enables the user to be quickly informed of a change in the statuses during different steps of operation.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
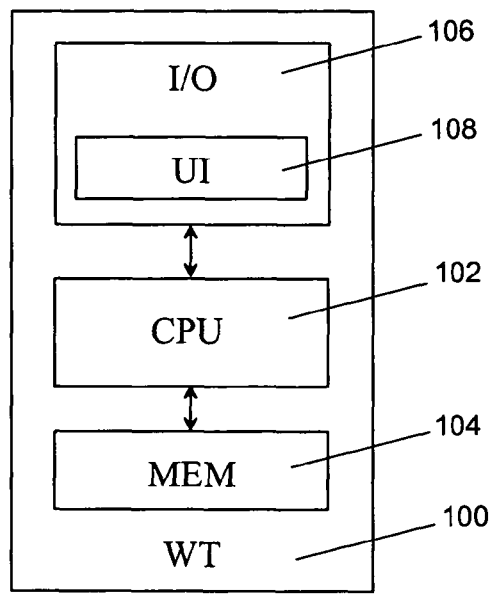
FIG. 1 shows a wireless terminal device to which the invention may be applied.

FIG. 1 is a block diagram showing a wireless terminal device (WT) 100 to which the invention may be applied. The wireless terminal device (WT) 100 comprises a central processing unit (CPU) 102, memory (MEM) 104 and an I/O system (I/O) 106. Necessary information is stored in the memory (MEM) 104 of the terminal device, which typically comprises read memory, such as ROM memory (Read Only Memory) and write memory, such as RAM memory (Random Access Memory) and/or FLASH memory. Through the I/O system (I/O) 106, the terminal device communicates externally, such as with other terminal devices, another network and user. A user interface (UI) 108, which is a part of the I/O system (I/O) 106, comprises an interface, such as a display, keys, a loudspeaker and/or a microphone, to enable the terminal device and the user to communicate with each other. Information obtained from different components of the terminal device is delivered to the central processing unit (CPU) 102, which processes the received information.

In the following, the invention is described by means of a typical platform. The platform may be e.g. a Series 60 Platform; however, the invention is not restricted to that platform exclusively but may be utilized together with any other corresponding system.

Intelligent wireless terminal devices usually employ a platform to enable software of a terminal device to be created thereon and to enable various mobile station applications and services. Typically, a platform comprises a graphical user interface and applications and technologies, such as an MMS (Multimedia Messaging Service), XHTML (Extensible Hypertext Markup Language) scanning and Java, built e.g. on a Symbian operating system. The platform enables software developers, operators and hardware manufacturers to create applications of their own thereon to operate between different devices and networks.

Typically, the platform further comprises ready-to-use applications that device manufacturers may insert in the devices they have manufactured. Such ready-to-use applications may provide e.g. public application programming interfaces (API) that enable access to the services of these applications from other applications. A platform may comprise e.g. the application of the invention for processing status information.

Figure 2:
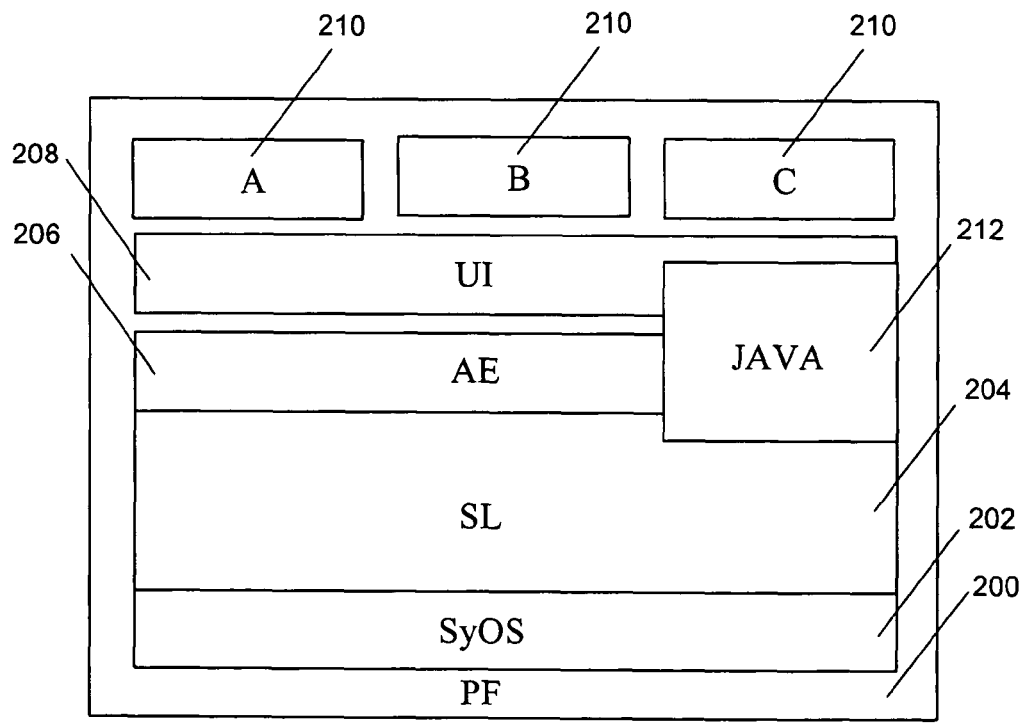
FIG. 2 shows the structure of a typical platform.

FIG. 2 shows the structure of a typical platform (PF) 200. The platform (PF) 200 is built on a Symbian operating system (SyOS) 202, supplementing it with a graphical user interface (UI) 208 and applications (A, B and C) 210. The Symbian operating system layer (SyOS) 202 comprises e.g. a core, a file server, memory management and device drivers. A system layer (SL) 204 typically provides communication and calculating services, such as a TCP/IP (Transmission Control Protocol/Internet Protocol), IMAP4 (Internet Message Access Protocol 4), SMS (Short Message Service) and database management. Application devices (AE) 206 enable software developers to create user interfaces of their own for application data and databases. The user interface (UI) 208 created on the Symbian operating system (SyOS) 202 is adapted for a certain device category, such as intelligent wireless terminal devices. The ready-to-use applications and those developed by a client (A, B and C) 210 supplement the particular wireless terminal device. A Java virtual machine 212, in turn, enables Java applications to be executed in the terminal device.

A dynamic phonebook is a terminal device application enabling a user to receive status information on other users at his or her terminal device through e.g. an Instant Messaging and Presence Service (IMPS). An Instant Messaging (IMS) service provides users of terminal devices with means for high-rate, interactive, mainly text-based data transfer. The advantage provided by instant messaging may be increased by adding a "presence service" thereto to monitor the status information on contacts, such as availability, mood, location or communication preferences. Several users of terminal devices may be combined e.g. through a mobile communication network and possibly one or more intermediate networks to an IMPS status server. Typically, the Internet is used as an intermediate network. As far as presence services are concerned, the IMPS status server may be functionally divided into a publisher server, which is a home service element for a client possessing presence information, and a subscriber server, which is a home to a subscribing or requesting client. Consequently, the user of a terminal device is served by both servers. The users may also update the status information to the status server or the status information is automatically updated when e.g. a user changes his or her profile.

A user of terminal device A may check the dynamic phonebook e.g. for the availability of a user of terminal device B. The user of terminal device B has in advance transmitted information to a status server, indicating that he or she is at a meeting, so the user of terminal device A sees this status information on his or her own terminal device. In such a case, the user of terminal device A may e.g. activate a watch service of the dynamic phonebook such that terminal device A gives a voice signal when the status of the status information on terminal device B changes. In another embodiment, no voice signal occurs.

Typically, a display of a wireless terminal device is an LCD display, i.e. a "Liquid Crystal Display". LCD displays may be further divided into passive and active matrix displays. Today, passive matrix displays are seldom used, mainly in special applications, due to their slowness. An active matrix display is also called a TFT (Thin Film Transistor) display.

The display of a wireless terminal device may be functionally divided into a front and a background. According to the prior art, a user of a terminal device receives information only through the front, such as text shown on the display. Typically, a selection element of the display is only used for selecting a desired procedure on the display. Since mobile stations are physically small, the size of a display cannot be increased considerably. Elements of the display, such as a selection and a background element, may, however, be utilized more efficiently according to the present invention such that the elements of the display are not merely static elements but "intelligent" elements whose appearance is determined by the status of the status information on a target to be pointed.

Figure 3:
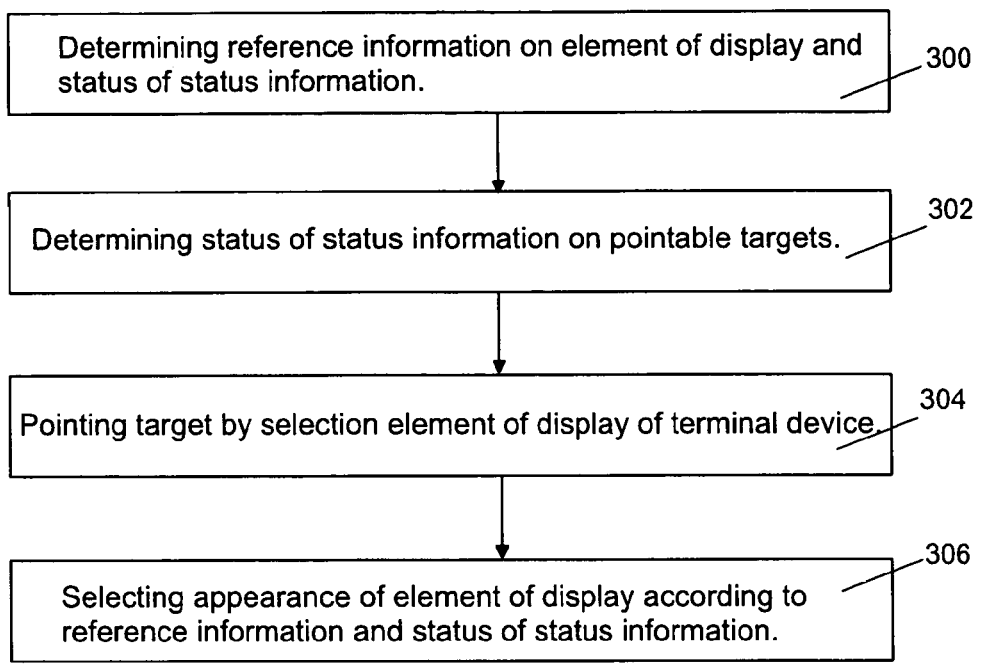
FIG. 3 shows a method according to a preferred embodiment of the invention.

FIG. 3 is a flow diagram showing a method according to a preferred embodiment of the invention for processing status information on determined functions in a wireless terminal device. Reference information on the appearance, such as colour, shape, pattern or a manner of animation, of an element of a display, such as a selection or a background element, and the status of the status information is determined (300) e.g. such that red means that a contact in a phonebook application is unavailable while green means that the contact is available. The statuses of status information on pointable targets on the display of the terminal device, such as contacts in a phonebook, are determined (302) e.g. such that through a mobile communication network and base transceiver stations, the terminal device receives information indicating whether or not the terminal device of a contact is connected to the network, or the terminal device receives status information on pointable targets from a status server, to which contact persons have transmitted their status information to be stored therein. When a user of the terminal device browses e.g. a contact list of the phonebook application and points (304) a pointable target by the selection element of the display, the appearance, such as colour, shape, pattern or a manner of animation, of an element of the display, such as a selection element or a background element, is selected according to the reference information and the status of the status information (306).

Figure 4A:
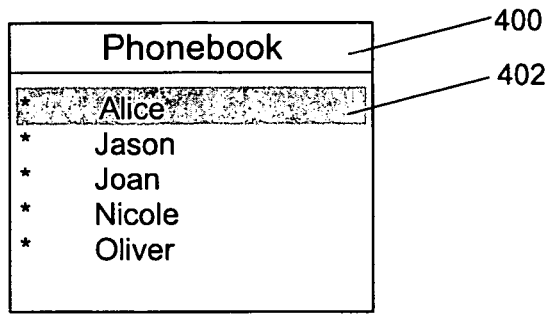
FIGS. 4a, 4b, 4c and 4d show the method according to a preferred embodiment of the invention.
Figure 4B:
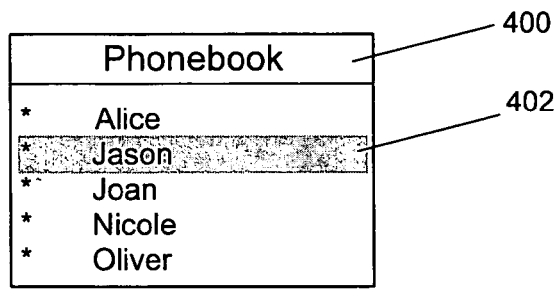
Figure 4C:
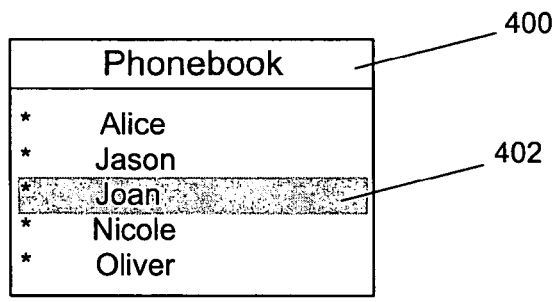
Figure 4D:
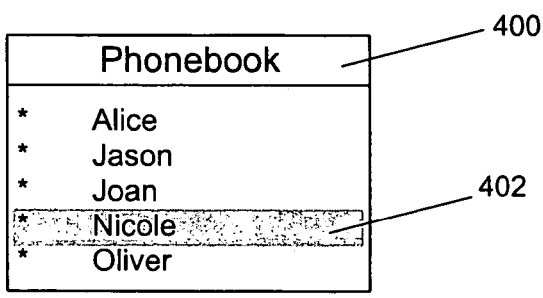

FIGS. 4a, 4b, 4c and 4d show a method according to a preferred embodiment of the invention, comprising processing status information on functions of pointable contacts of a phonebook application 400 of a wireless terminal device. Here, reference information on the colour of a selection element of a display and the status of the status information, such as availability, is herein determined such that red means unavailability, yellow possible availability, green positive availability, and blue that according to the phonebook, the contact has no dynamic functions, such as contact information, in the phonebook, or such information may not be shown. Status information is updated in the terminal device e.g. such that the terminal device receives automatically status information on contacts from a status server, to which contact persons have transmitted their information to be stored therein. Alternatively, status information may also be actively retrieved from a status server. When a user of the terminal device browses the contact list of the phone book 400 by means of a selection element 402, the selection element is focused on one contact at a time. On the basis of the status of the status information, the colour of the selection element 402 of the contact list is selected. In FIGS. 4a, 4b, 4c and 4d, the selection element 402 is shown just grey. In the case of FIG. 4a, the selection element 402 would, however, in practice be red since the status of the status information on Alice is unavailable. In the case of FIG. 4b, the selection element 402 would in practice be yellow since the status of the status information on Jason is possibly available. In the case of FIG. 4c, the selection element 402 would in practice be green since Joan's status is positively available. In the case of FIG. 4d, the selection element 402 would be blue since Nicole's telephone number has not been stored in the phonebook.

Figures 5A, 5B, 5C:
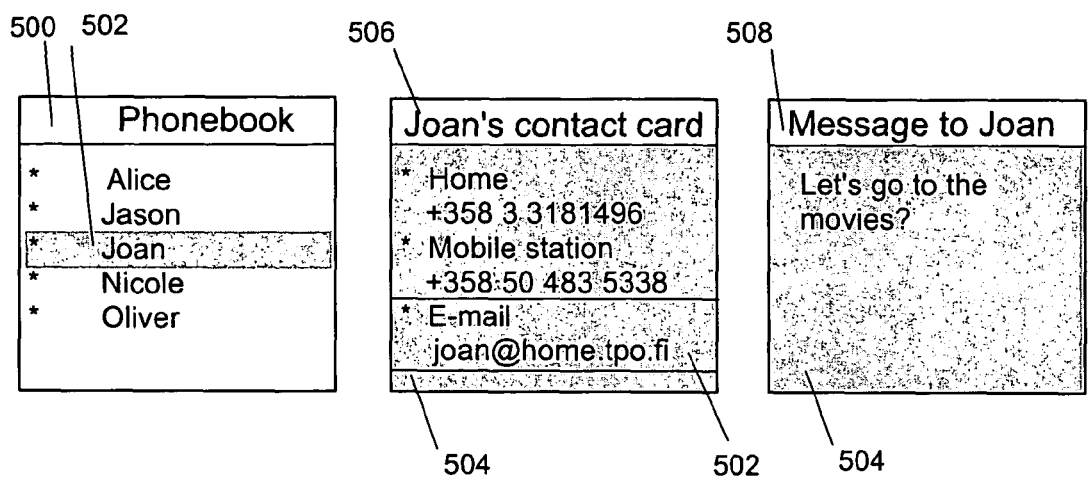
FIGS. 5a, 5b and 5c show the method of a preferred embodiment of the invention.

FIGS. 5a, 5b and 5c show a method according to a preferred embodiment of the invention, comprising processing status information on the functions of pointable contacts of a phonebook application 500 of a wireless terminal device. Reference information on the colour of a selection and background element of a display and the status of status information is determined in accordance with the example shown in FIGS. 4a, 4b, 4c and 4d. Status information, such as availability, on the functions of the contacts of the phonebook application 500 is determined as shown above. When a user of the terminal device wishes to contact Joan, he or she browses the phonebook 500 by means of a selection element 502 until the selection element 502 points Joan. Since according to the status information Joan is available, the colour of the selection element 502 is selected to be green. Due to printing technology, only grey is used in FIGS. 5a, 5b and 5c. When a user opens Joan's contact card 506, the colour of a background element 504 of the page is also selected according to the status information, as in connection with the selection element. Then, the green colour of the selection element 500 is also the background colour of the contact card until the status of the status information undergoes a change. Next, the user wishes to write an e-mail message to Joan. The user opens a text message page 508, the colour of whose background element 504 is again selected to be the same colour of green since according to the status information Joan is still available. During the entire operating sequence, the user is thus able to see the status of a contact person. Since the status information is determined dynamically, the colour of the selection element 500 and the background element 504 changes quickly as the status of the contact person changes. No need thus exists for the user to return to the phonebook 500 in order to check whether or not the status of the contact person has possibly changed during the operating sequence.

According to a preferred embodiment of the invention, the colours of the elements used for indicating different information, such as different telephone numbers, fax, direct communication, a multimedia message, a text message and a game session, e.g. on a contact card or an electric business card, are selected separately on the basis of status information such that e.g. the colour selected to be the colour of the element for an e-mail address is green but the colour of the element for a mobile phone number is red. This enables a user of a terminal device to see, e.g. directly in an opened contact card or by browsing different contact alternatives, how a user of another terminal device is available at the particular moment.

According to a preferred embodiment, a contact list is browsed e.g. only after opening an application, such as a game. The status information on contacts are automatically updated in a terminal device, so that a user of the terminal device may have somebody to play with from among the contacts of the contact list, the colour of the element indicating such contacts being e.g. green, which in this case means availability.

According to a preferred embodiment of the invention, the appearance of an element of a display and prior art effects, such as icons, can be used together.

According to a preferred embodiment of the invention, status information on pointable messages of a text message application of a wireless terminal device is processed. Reference information on the colour of a selection element and the status of the status information, such as whether or not a message has been read or whether or not a message has been replied to, is determined such that red means that a text message has not been read, green that a text message has been read and replied to, and blue that a text message has been read but not replied to. The status information on the messages in the text message application can be determined e.g. on the basis of functional information, such as reading or transmitting a text message, stored in the memory of a terminal device. When a user of the terminal device focuses a selection element on a target, the colour of the selection element of a display is selected in a predetermined manner in accordance with the status of the status information on the message. The method thus makes it easier for the user of the terminal device to detect the messages that require some action to be taken by the user.

The method of the invention can be implemented e.g. by the wireless terminal device of FIG. 1, comprising means for pointing at least one target on a display of the terminal device.

According to a preferred embodiment of the invention, the wireless terminal device comprises means for determining reference information on the appearance of at least one element of a display and the status of status information, means for determining the status of at least one piece of status information on at least one pointable target, means for pointing at least one target on the display of the terminal device, and means for selecting the appearance of an element of the display in accordance with the reference information and the status of the status information in response to pointing the target.

A status information processing functionality may also be achieved by means of a software product arrangeable in a wireless terminal device for implementing the method of the invention, such as the method according to a preferred embodiment of the invention shown in the flow diagram of FIG. 3.

According to a preferred embodiment of the invention, the software product comprises a software code for determining reference information on the appearance of at least one element of a display and the status of status information, a software code for determining the status of at least one piece of status information on at least one pointable target, a software code for pointing at least one target, and a software code for selecting the appearance of an element of the display in accordance with the reference information and the status of the status information in response to pointing the target.

It is obvious to one skilled in the art that as technology advances, the basic idea of the invention may be implemented in many different ways. The invention and its embodiments are thus not restricted to the above-described examples but may vary within the scope of the claims.

The invention claimed is:

1. A method comprising:
    determining, in a wireless terminal device, reference information on at least one pointable target element of a display of the terminal device, wherein the pointable target element displays information regarding a contact;
    determining a presence status of the contact; and
    setting an appearance of a background of the pointable target element in accordance with the reference information and the presence status in response to pointing at the at least one pointable target element.

2. The method as claimed in claim 1, further comprising determining the presence status from a status server, in which status server the status information has been stored.

3. The method as claimed in claim 1, further comprising using one or more elements of the display for pointing one or more pointable targets on the display.

4. The method as claimed in claim 1, further comprising selecting the colour, shape, pattern or a manner of animation of the appearance of the background of the pointable target element of the display in a predetermined manner according to the presence status in response to pointing at the at least one pointable target element.

5. A wireless terminal device comprising:
    at least one processor; and
    at least one memory including computer program code, the at least one memory and the computer program code configured to, with the at least one processor, cause the wireless terminal device at least to:
        determine reference information on at least one pointable target element of a display, wherein the pointable target element displays information regarding a contact;
        determine a presence status of the contact; and
        set an appearance a background of the pointable target element of the display in accordance with the reference information and the presence status in response to pointing at the pointable target element.

6. The wireless terminal device according to claim 5, wherein the terminal device is configured to receive the presence status from a status server.

7. The wireless terminal device as claimed in claim 5, wherein
the terminal device is configured to use one or more elements of the display for pointing one or more targets on the display.

8. The wireless terminal device as claimed in claim 5, wherein
the terminal device is configured to select the colour, shape, pattern or a manner of animation of the appearance of the background of the pointable target element of the display in a predetermined manner in accordance with the presence status in response to pointing at the at least one pointable target element.

9. A method comprising:
    displaying contact information via a target user interface element of a wireless terminal device, wherein the contact information includes one or more alternative modes of communication with a contact, and wherein each of the modes of communication is represented by a respective pointable target element;
    determining, via a network, presence status information related to the one or more modes of communication; and
    setting a background appearance of the pointable target elements to reflect the presence status information of the modes of communication represented by the respective pointable target elements.

10. The method of claim 9, comprising:
    facilitating selection of one of the pointable target elements to open an application for communication via the mode of communication represented by the selected one pointable target element; and
    modifying a background appearance of the application to reflect the presence status information of the mode of communication represented by the selected one pointable target element.

11. The method of claim 10, further comprising:
    dynamically determining changes to the presence status information of the mode of communication represented by the selected one pointable target element while the application is in use; and
    updating the background appearance of the application to reflect the changes to the presence status information.

12. The method of claim 9, wherein the contact information is displayed via the target user interface element in a dynamic phonebook.

13. The method of claim 9, wherein the contact information is displayed in response to opening an application that facilitates communication with the contact.

14. The method of claim 9, wherein the background appearance of the pointable target elements is modified to reflect the presence status information in response to user selection of the pointable target element.

15. A computer readable non-transitory storage medium encoded with software code for causing a device to perform the method of claim 9.

16. A wireless terminal device comprising:
    at least one processor; and
    at least one memory including computer program code, the at least one memory and the computer program code configured to, with the at least one processor, cause the wireless terminal device at least to:
        display contact information via a target user interface element, wherein the contact information includes one or more alternative modes of communication with a contact, and wherein each of the modes of communication is represented by a respective pointable target element;

determine, via a network, presence status information related to the one or more modes of communication; and set a background appearance of the pointable target elements to reflect the presence status information of the modes of communication represented by the respective pointable target elements.

17. The wireless terminal device of claim 16, wherein the computer program code further causes the wireless terminal device to:

facilitate selection of one of the pointable target elements to open an application for communication via the mode of communication represented by the selected one pointable target element; and modify a background appearance of the application to reflect the presence status information of the mode of communication represented by the selected one pointable target element.

18. The wireless terminal device of claim 17, wherein the computer program code further causes the wireless terminal device to:

dynamically determine changes to the presence status information of the mode of communication represented by the selected one pointable target element while the application is in use; and update the background appearance of the application to reflect the changes to the presence status information.

19. The wireless terminal device of claim 16, wherein the background appearance of the pointable target elements is modified to reflect the presence status information in response to user selection of the pointable target element.

20. A computer readable non-transitory storage medium encoded with software code for causing a device to perform the method of claim 1.

* * * * *